United States Patent
McSwiggan (10) Patent No.: US 11,640,584 B2
(45) Date of Patent: May 2, 2023

(54) SYSTEM AND METHOD FOR REAL-TIME PREDICTIVE SCHEDULING

(71) Applicant: Verint Americas Inc., Alpharetta, GA (US)

(72) Inventor: Stephen McSwiggan, Scotland (GB)

(73) Assignee: VERINT AMERICAS INC, Alpharetta, GA (US)

( * ) Notice: Subject to any disclaimer, the term of this patent is extended or adjusted under 35 U.S.C. 154(b) by 233 days.

(21) Appl. No.: 15/683,368

(22) Filed: Aug. 22, 2017

(65) Prior Publication Data

US 2019/0066059 A1    Feb. 28, 2019

(51) Int. Cl.
| | |
|---|---|
| *G06Q 10/10* | (2012.01) |
| *G06N 5/04* | (2006.01) |
| *G06Q 10/06* | (2012.01) |
| *G06Q 10/1093* | (2023.01) |
| *G06Q 10/0631* | (2023.01) |
| *G06N 5/046* | (2023.01) |

(52) U.S. Cl.
CPC ........... *G06Q 10/1095* (2013.01); *G06N 5/04* (2013.01); *G06Q 10/063116* (2013.01); *G06N 5/046* (2013.01)

(58) Field of Classification Search
CPC ....... G06Q 10/1095; G06Q 10/063116; G06N 5/04; G06N 5/046
USPC ........................................................ 705/7.19
See application file for complete search history.

(56) References Cited

U.S. PATENT DOCUMENTS

| | | | | |
|---|---|---|---|---|
| 6,144,971 A * | 11/2000 | Sunderman | .......... | G06Q 10/109 715/205 |
| 10,062,042 B1 * | 8/2018 | Kelly | ............. | G06Q 10/063112 |
| 2006/0212336 A1 * | 9/2006 | Powers | ................... | G06Q 10/06 705/7.21 |
| 2006/0229896 A1 * | 10/2006 | Rosen | ................ | G06Q 10/1053 705/321 |
| 2010/0165977 A1 * | 7/2010 | McCord | .............. | H04M 3/5238 370/352 |
| 2014/0324499 A1 * | 10/2014 | Placiakis | ........ | G06Q 10/063116 705/7.16 |
| 2014/0355749 A1 * | 12/2014 | Conway | .............. | H04M 3/5238 379/265.1 |
| 2015/0142490 A1 * | 5/2015 | Georgiades | .... | G06Q 10/063114 705/7.15 |

(Continued)

OTHER PUBLICATIONS

A data informed Performance Influencing Factors for model-based human reliability analysis; Groth et al. (Year: 2012).*

*Primary Examiner* — Timothy Padot
*Assistant Examiner* — Francis Z. Santiago Merced
(74) *Attorney, Agent, or Firm* — Christopher M. Scherer; Erin Ella Block; DeWitt LLP (57) ABSTRACT

The present application includes a method and system for real-time predictive scheduling. The system receives information from at least one workload input and at least one personnel input, calculating an initial schedule based on the information and on analytics rules in a scheduling analytics engine. The system then allocates incoming workloads to customer service representatives according to the initial schedule, while monitoring adherence to the initial schedule by calculating deviation from schedule adherence. If the deviation from schedule adherence exceeds an acceptable deviation from schedule adherence within the analytics rules, the system calculates an updated schedule.

20 Claims, 4 Drawing Sheets

(56) References Cited

U.S. PATENT DOCUMENTS

| | | | |
|---|---|---|---|
| 2015/0178649 A1* | 6/2015 | Furman | G06Q 10/06312 |
| | | | 705/7.22 |
| 2015/0363746 A1* | 12/2015 | Fairbanks | G06Q 10/063116 |
| | | | 705/7.15 |
| 2018/0101809 A1* | 4/2018 | Bnayahu | G06Q 10/10 |
| 2018/0204169 A1* | 7/2018 | Cao | G06Q 10/087 |
| 2018/0349829 A1* | 12/2018 | Peterson | G06Q 10/063112 |
| 2019/0050786 A1* | 2/2019 | Muser | G06Q 10/063116 |

* cited by examiner

SYSTEM AND METHOD FOR REAL-TIME PREDICTIVE SCHEDULING

FIELD

The present disclosure is directed to a method for computer analysis, specifically a method of predictive scheduling in real-time.

BACKGROUND

In a modern high-volume customer engagement center(s) (CEC) and associated back office(s), it is necessary to be able to predict future workloads in order to produce a schedule for the large number of customer service representatives (CSRs) and back-office workers (collectively "personnel") with different skills and experience levels. This includes not only predicting the amount of work but also the distribution of work across the set of required skills of personnel. For example, a manufacturer of farm equipment may keep a very small staff of personnel at night, but begin scheduling a significantly larger staff at 4 am. By contrast, a commercial US bank may staff no personnel after 6 pm PST, and begin staffing personnel at 8 am EST.

It is often the case, however, that when a schedule is created, unexpected increases or decreases in workload increase or decrease, respectively, the number of personnel needed. Changes in work distribution may also require modification of the allocation of personnel to a particular area. For example, a financial institution may expect 1,000 contacts per hour, split as 700 account enquiries, 200 loan applications, and 100 mortgage applications. An abrupt spike in mortgage applications to 300 per hour with a drop in account enquiries to 500 per hour would require the bank to shift resources between specific areas as opposed to increasing the total number of personnel. Such changes require real-time monitoring and correction to the schedule.

Unfortunately, real-time coordination of hundreds or potentially thousands of personnel is practically impossible for human resources staff, particularly if the personnel are spread across multiple offices and time zones. In the case of outsourced services supplied to multiple companies, a CEC or back office may need to account for each company's work policies, adding an additional layer of scheduling complexity. Modern electronic scheduling programs are also unable to provide such capabilities. As a result, customers may face excessive wait times to speak with a CSR, leading to increased customer dissatisfaction, or back-office workers may be idle, wasting an organization's money.

There is an unmet need in the art for a system and method capable of automatically scheduling and rescheduling in real-time as a response to shifting workloads.

SUMMARY

An exemplary embodiment of the present application is a method for real-time predictive scheduling. The method receives information from at least one workload input and at least one personnel input, calculating an initial schedule based on the information and on analytics rules in a SAE. The method then allocates incoming workloads to personnel according to the initial schedule, while monitoring adherence to the initial schedule by calculating deviation from schedule adherence. If the deviation from schedule adherence exceeds an acceptable deviation from schedule adherence within the analytics rules in the SAE, the method calculates an updated schedule.

Another exemplary embodiment of the present application is a system for real-time predictive scheduling. The system includes a processor and a non-transitory computer readable medium programmed with computer readable code that upon execution by the processor causes the processor to execute the above-mentioned method for real-time predictive scheduling.

Another exemplary embodiment of the present application is a non-transitory computer readable medium programmed with computer readable code that upon execution by a processor causes the processor to execute the above-mentioned method for real-time predictive scheduling.

The objects and advantages will appear more fully from the following detailed description made in conjunction with the accompanying drawings.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Predictive personnel scheduling (PPS) systems allow personnel to engage with customers in a controlled manner. By updating scheduling in real time using a PPS system, the PPS system can allow an organization to achieve several key benefits. First, the system will provide an initial schedule, taking into account historic workloads and the availability of personnel, and automatically route work according to the schedule. Second, the system will monitor the workload and personnel availability to ensure that the schedule is followed. Third, the system will automatically update the schedule to account for changing workloads and personnel availability, even for a large-scale, highly distributed workforce, thereby ensuring a constantly optimized schedule and reduced backlogs and customer dissatisfaction.

In embodiments, it is desirable for the system to periodically determine the amount, if any, of schedule deviation. This permits the system to determine when it must alter the schedule to prevent backlog and inefficient work distribution. In an embodiment, it is desirable to analyze the effect of the schedule alteration on work distribution to determine efficacy. In yet another embodiment, it is desirable to update the standards by which the schedule updates.

Figure 1:
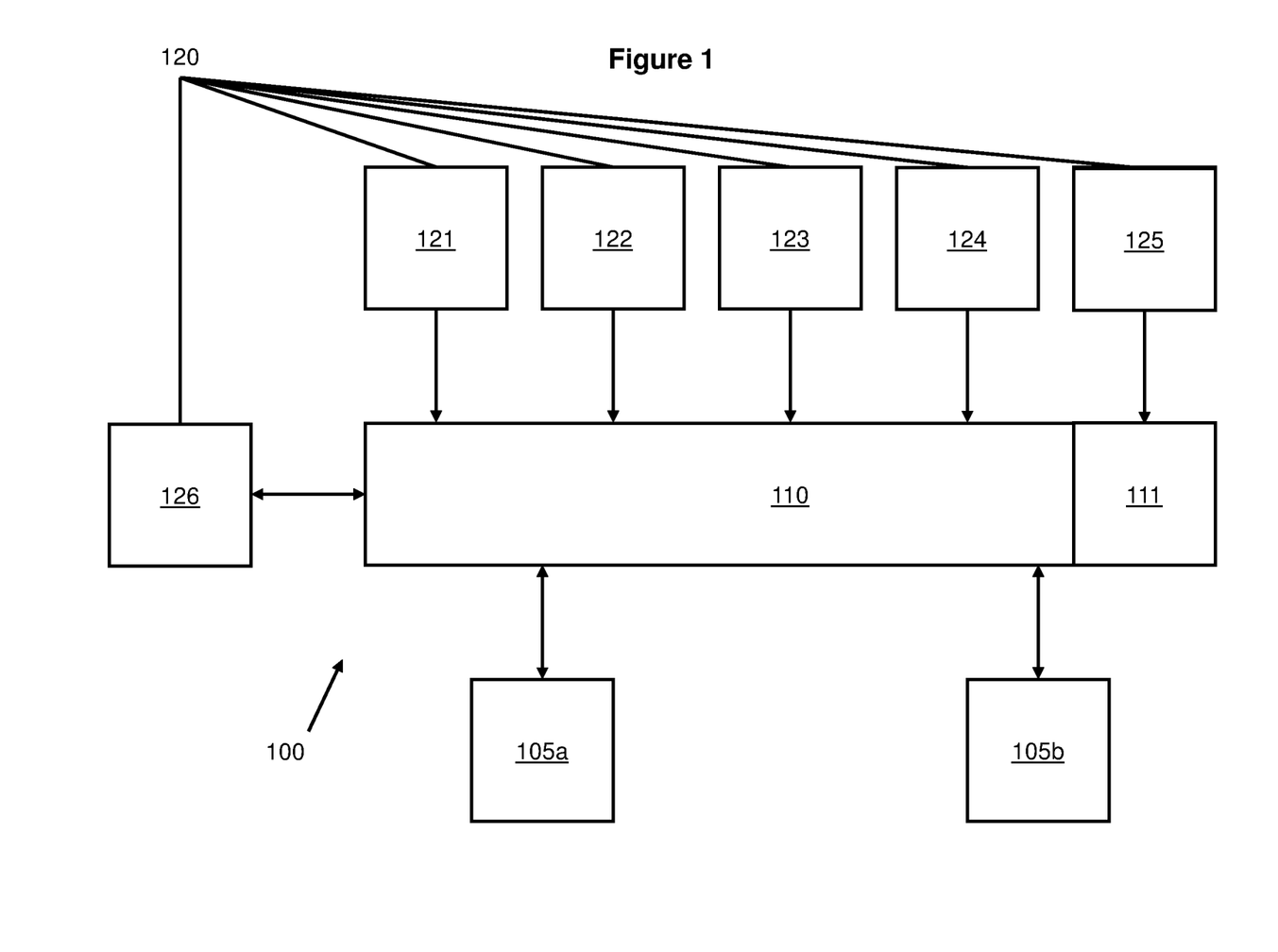
FIG. 1 depicts an exemplary embodiment of a PPS system for real-time predictive scheduling.

FIG. 1 depicts an exemplary embodiment of PPS system 100 for real-time predictive scheduling. PPS system 100 includes a Scheduling Analytics Engine (SAE) 110 having multiple scheduling inputs 120 used to generate an initial schedule 105a and, if necessary, and updated schedule 105b.

SAE 110 includes a set of analytics rules 111 used to analyze all information received by SAE 110. Analytics rules 111 may include minimum and maximum personnel staffing, the acceptable deviation from schedule adherence, skill requirements for personnel, experience level requirements for personnel, authority level requirements for personnel, and the interim for performing SAE analysis. Analytics rules 111 may be time-variable or -invariable values, and may include exceptions and the conditions for exceptions. Analytics rules 111 may be user-generated or pre-generated, and may be updated by users. Analytics rules 111 may be a software program or programs, or a separate file or files executed by a software program.

For example, analytics rules 111 for a banking organization may require SAE analysis every ten minutes, but allocate no personnel between 6 pm PST and 8 am EST or on national holidays. New 24-hour customer services may require personnel availability at all times, necessitating alteration to analytics rules 111. By contrast, analytics rules 111 for a medical supply company may require multiple personnel between 6 pm PST and 8 am EST, at least one of whom has supervisory authority, and but only require SAE analysis every half hour due to historically low workload. Changes to product lines may allow the medical supply company to dispense with overnight personnel requirements, requiring alteration to analytics rules 111.

SAE 110 also performs routing of incoming workloads based on initial schedule 105a or updated schedule 105b. SAE 110 categorizes incoming workloads according to the skill sets and skill levels of personnel and assigns the workloads to appropriate personnel based on the requirements of initial schedule 105a or updated schedule 105b. It should be understood that "incoming workload" can refer to any assignable communication or task, such as, but not limited to, incoming and outgoing customer interactions, as well as back-office tasks and any other work that can be assigned to personnel.

SAE 110 may also assign personnel to specific channels and queues. By way of non-limiting example, a supervisory CSR with extensive experience in a particular area may receive an incoming customer interaction for that area, while another interaction is routed to another CSR with less experience only when the supervisory CSR is unavailable. By way of another non-limiting example, if a particular queue or channel experiences a backlog, requiring rescheduling to receive additional personnel, three additional back-office workers may be assigned to receive incoming back-office tasks from that queue or channel.

Optionally, SAE 110 also performs routing based on analytics rules 111. By way of another non-limiting example, a back-office worker with commercial services experience may receive two incoming workloads, even though other personnel are available, because she is the only personnel who has the appropriate experience. Analytics rules 111 relating to routing can also be updated based on feedback calculated by SAE 110.

Scheduling inputs 120 provide SAE 110 with input information for generating and updating schedules. At least one workload input 121 provides a historical record of the workload as initial schedule information. This includes the historic incoming workload for a given period. This information may be further broken down by personnel specialty or personnel level, such as, by way of non-limiting example, the number of interactions with personnel in commercial versus personal services or the amount of work assignable to personnel versus supervisory personnel. At least one personnel input 122 provides information for identification of personnel, along with their respective skills and work schedules. By way of non-limiting example, such information may include that a first CSR is a personal services CSR scheduled to work from 11 am to 7 pm Tuesday through Saturday, while a second CSR is a commercial services supervisory CSR scheduled to work from 8 am to 4 pm Monday through Friday.

At least one workload update input 123 provides a real-time input of workload and related information. Such information can include the volume of work generated for a given period, the work throughput for a given period, and any work backlog for a given period. Backlog can be considered as, but is not limited to, a number or percentage of waiting customers as compared to personnel, an average or median wait time, or any combination thereof. At least one personnel update input 124 provides updates for personnel availability, such as a personnel absence, shift change, or an anomalous decrease or increase in available personnel. At least one rules update input 125 allows direct updates to analytics rules 111 under a user's control, while at least one engine update input 126 allows direct updates to SAE 110.

SAE 110 utilizes information received from workload input 121 and personnel input 122 to calculate an initial schedule 105a. As time progresses, SAE 110 utilizes information from workload update input 123 and personnel update input 124 to periodically calculate the current level of adherence to initial schedule 105a and compare it to the acceptable deviation from schedule adherence found in analytics rules 111. If the current level of adherence is below the acceptable deviation, then no action is necessary and personnel continue to work according to initial schedule 105a. If the current level of adherence is above the acceptable deviation, then SAE 110 utilizes initial schedule 105a, analytics rules 111, and information from workload update input 123 and personnel update input 124 to create updated schedule 105b. Note that such deviation may occur due to underutilization of available personnel due to low workload as well as overutilization of available personnel due to high workload.

Optionally, SAE 110 also performs feedback calculations of the success of updated schedule 105b based on changes in backlogs and work distribution. These calculations may be provided to rules update input 125 and engine update input 126 to allow rules update input 125 and engine update input 126 to modify analytics rules 111 and SAE 110, respectively, based on the efficacy of updated schedule 105b.

Figure 2A:
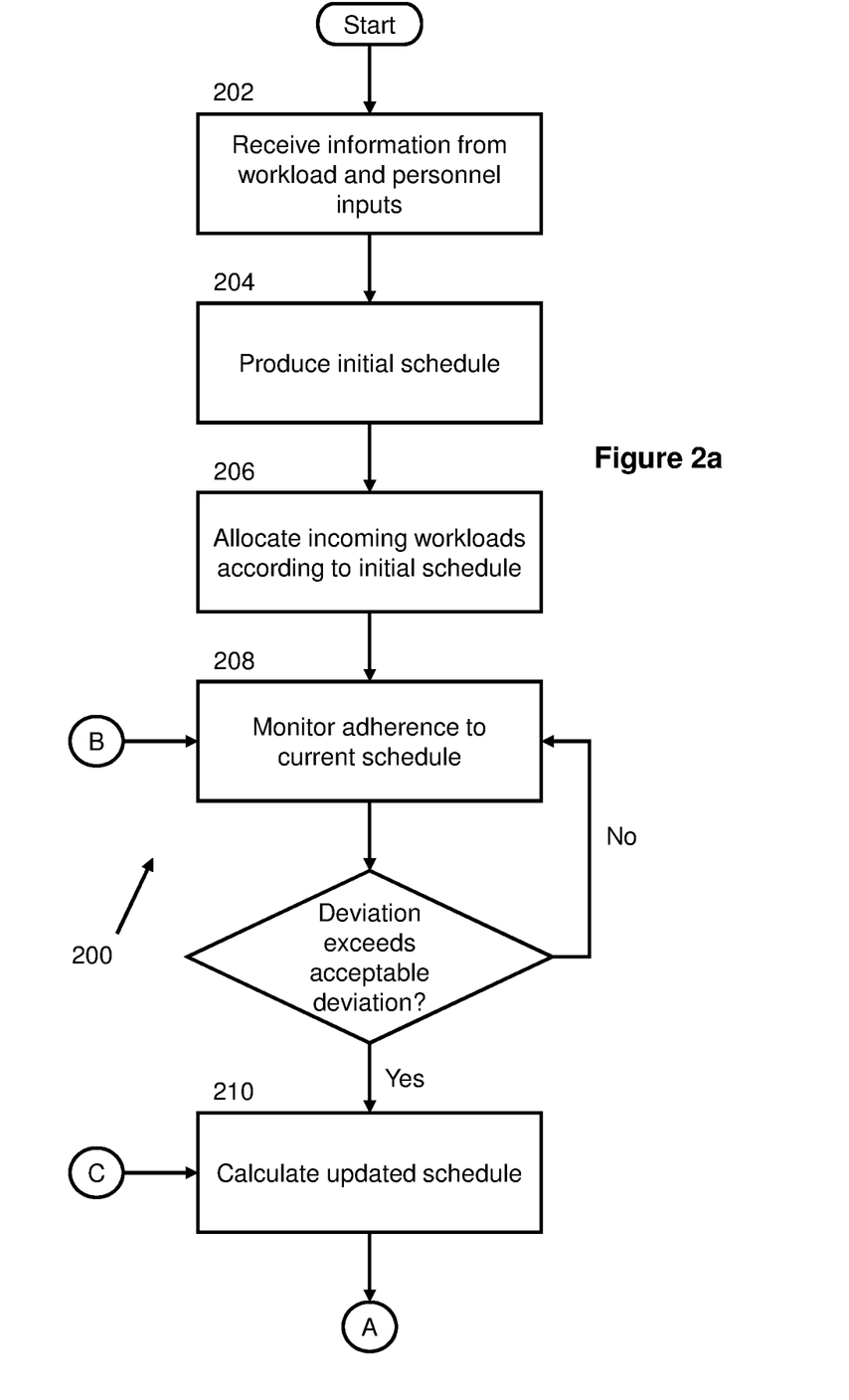
FIGS. 2a and 2b depict a flowchart of an exemplary embodiment of a method for real-time predictive scheduling.
Figure 2B:
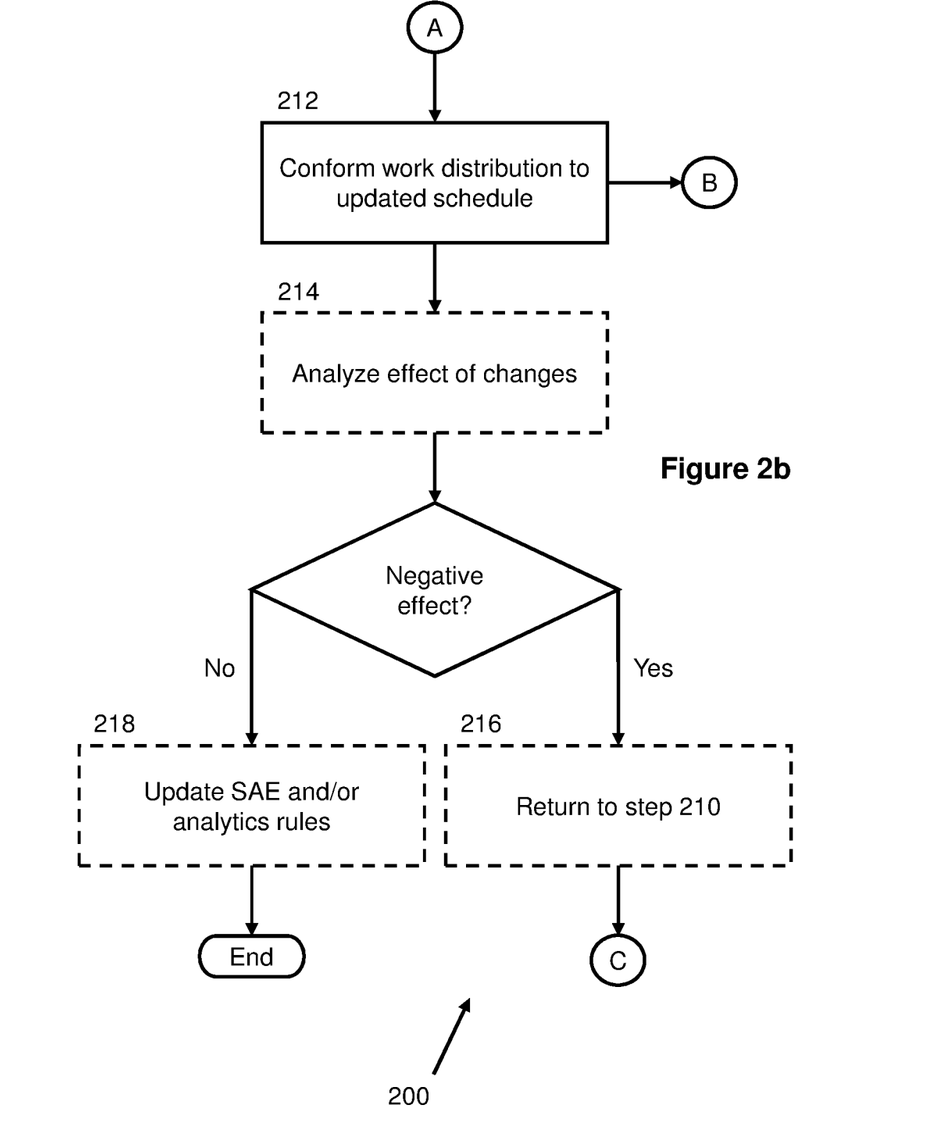

FIGS. 2a and 2b depict a flowchart of an exemplary embodiment of method 200 for real-time predictive scheduling.

In step 202, the PPS system receives information from workload and personnel inputs, including historical incoming work patterns and information on personnel skills and shift patterns.

In step 204, a SAE in the PPS system produces an initial schedule based on analytics rules as well as the historical incoming work patterns and information on personnel skills and shift patterns received from at least one workload input and at least one personnel input.

In step 206, the SAE allocates incoming workloads to personnel according to the initial schedule.

In step 208, the SAE monitors adherence to the current schedule by periodically calculating deviation from schedule adherence at predetermined intervals. This calculation is based on the initial schedule and information received from at least one workload update input and at least one personnel update input. The current schedule monitored may be the initial schedule or an updated schedule based on the initial schedule. The predetermined intervals may be determined and input by a user or may be part of the analytics rules.

In optional step 210, if the deviation from schedule adherence exceeds the acceptable deviation from schedule adherence in the analytics rules, the PPS system calculates the updated schedule. The updated schedule is based on the initial schedule and information received from workload update and personnel update inputs.

In optional step 212, the PPS system automatically adjusts work routing, and personnel channel and queue allocations to conform to the updated schedule and returns to step 208 to monitor adherence to the updated schedule.

In optional step 214, the PPS system analyzes the effect of the changes made to create the updated schedule by calculating feedback based on changes in backlogs and work distribution.

In optional step 216, if the feedback indicates that the updated schedule has had a negative effect on work distribution, the PPS system returns to step 210 and recalculates an updated schedule.

In optional step 218, the PPS system receives updates to the SAE and/or to the analytics rules through at least one engine update input and/or at least one rules update input, respectively.

Figure 3:
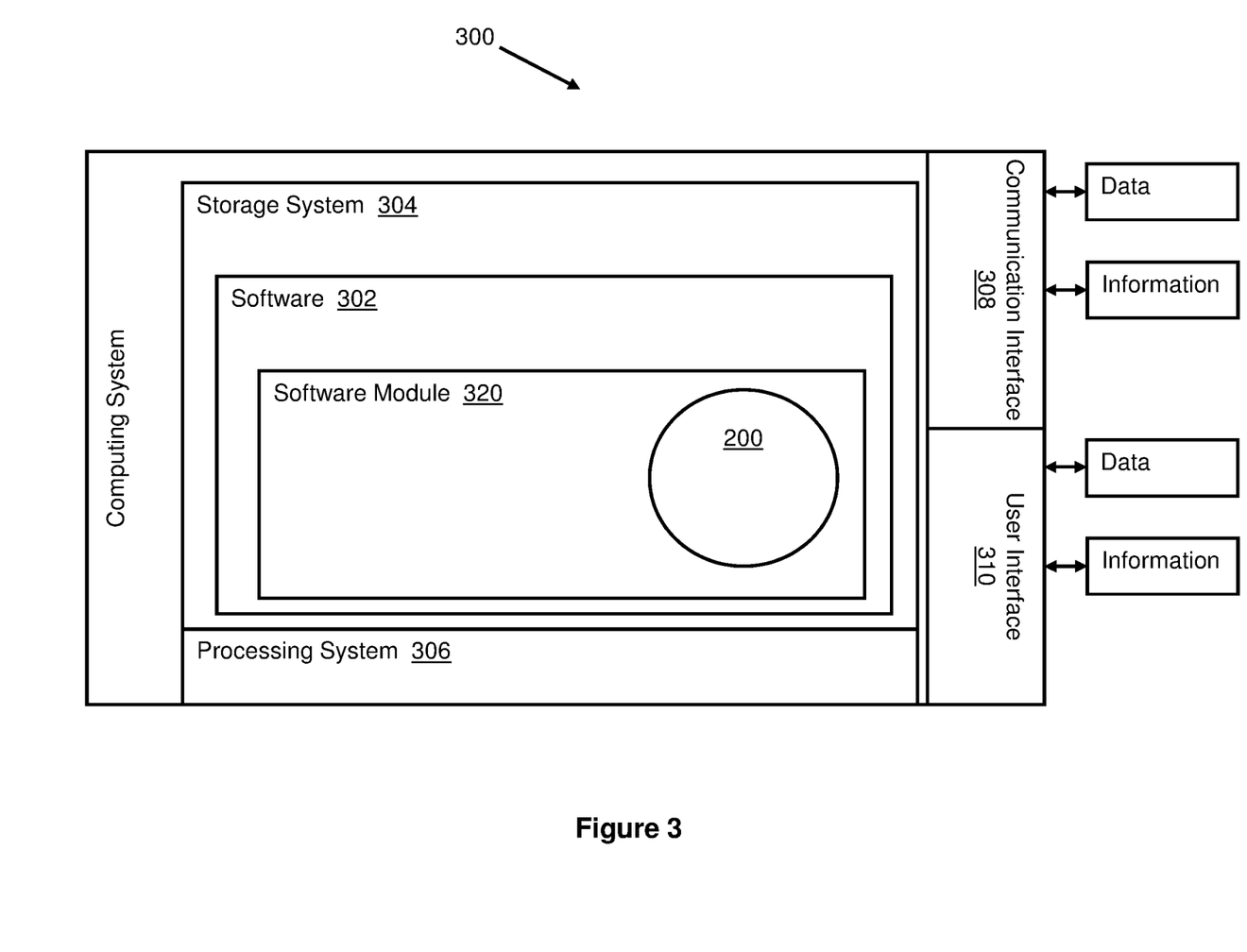
FIG. 3 depicts an exemplary embodiment of a system for real-time predictive scheduling.

FIG. 3 depicts an exemplary embodiment of system 300 for organizing and integrating electronic customer service resources using PPS system 100.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes a software module 320 for performing the function of PPS system 100. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include verbal or textual communications to or from a customer and details about a request, a work order, a back-office task, or another set of data that will necessitate an interaction between a customer and the personnel. In embodiments, the communication interface 308 also operates to send and/or receive information, such as, but not limited to, information to/from other systems to which computing system 300 is communicatively connected, and to receive and process information from system inputs 120, as described in greater detail above. Such information can include input related to initial and updated workload and personnel availability, updates to SAE 110, and/or updates to analytics rules 111.

User interface 310 can include one or more system inputs 120, a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display documents or another interface further associated with embodiments of the system and method as disclosed herein. Speakers, printers, haptic devices and other types of output devices may also be included in the user interface 310. Personnel or other staff can communicate with computing system 300 through the user interface 310 in order to view documents, enter or receive data or information, enter information into system inputs 120, manage an interaction or back-office task, or any number of other tasks the personnel or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for real-time predictive scheduling, comprising:
receiving, by a scheduling analytics engine, a set of historical incoming work patterns, the set of historical incoming work patters including historic incoming workloads for a given time period;
receiving, by the scheduling analytics engine, a set of personnel data, each of the personnel data including a personnel identification, a set of personnel skills, and a set of shift patterns;
generating, by the scheduling analytics engine, an initial schedule that routes incoming work from an incoming workload to one of a plurality of workload queues based on an analysis of the set of historical incoming work patterns, the set of personnel data, and a set of analytics rules;
receiving in real-time, by the scheduling analytics engine, work items from a current incoming workload;
routing, by the scheduling analytics engine, each work item from the current incoming workload to one of the plurality of workload queues according to the initial schedule;
continually monitoring, by the scheduling analytics engine, in real-time the current incoming workload to generate workload updates, the current incoming workload including a real-time current volume of work and a real-time current backlog of work;
continually monitoring, by the scheduling analytics engine, in real-time changes in the set of personnel data to generate personnel data updates including a change in the set of shift patterns associated with each of the personnel data;
generating in real-time a current deviation from adherence to the initial schedule based on the workload updates generated and personnel data updates generated;
determining that the current deviation from adherence is greater than a threshold deviation;
based on the current deviation from adherence being greater than the threshold deviation, generating, by the scheduling analytics engine, an updated schedule to route incoming work from the incoming workload to one of the plurality of workload queues based on the initial schedule, the personnel data updates generated, and the workload updates generated;
rerouting, by the scheduling analytics engine, in real-time work items from the current incoming workload according to the updated schedule;
reallocating, by the scheduling analytics engine, personnel data assignments to the plurality of workload queues according to the updated schedule;
generating, by the scheduling analytics engine, a set of backlog information and a set of work distribution information for the updated schedule;
comparing, by the scheduling analytics engine, the set of backlog information for the updated schedule to a set of backlog information generated for the initial schedule generate a set of feedback pertaining to a positive or negative effect the updated schedule had on backlog information; and
based on the generated set of feedback, regenerating, by the scheduling analytics engine, the updated schedule.

2. The method of claim 1, further comprising repeating monitoring, by the scheduling analytics engine, the current incoming workload until the current deviation from adherence is less than the threshold deviation.

3. The method of claim 1, wherein the historic incoming workloads include information detailing a number of interactions routed to each of the plurality of workload queues and the personnel data assigned to each of the plurality of workload queues.

4. The method of claim 1, wherein the current incoming workload further includes a work throughput.

5. The method of claim 1, further comprising reallocating, by the scheduling analytics engine, personnel data assignments to the plurality of workload queues according to the updated schedule and reallocating the current incoming workload according to the updated schedule.

6. The method of claim 1, further comprising automatically updating, by the scheduling analytics engine, the set of analytics rules based on the generated set of feedback.

7. The method of claim 1, further comprising receiving updates to the scheduling analytics engine through an engine update input.

8. A computerized system for real-time predictive scheduling, comprising:
a processor;
a non-transitory computer readable medium programmed with computer readable code that upon execution by the processor causes the processor to:
receive, by a scheduling analytics engine, a set of historical incoming work patterns, the set of historical incoming work patterns including historic incoming workloads for a given time period;
receive, through the scheduling analytics engine, a set of personnel data, each of the personnel data including a personnel identification, a set of personnel skills, and a set of shift patterns;
generate, by the scheduling analytics engine, an initial schedule that routes incoming work from an incoming workload to one of a plurality of workload queues based on an analysis of the set of historical incoming work patterns, the set of personnel data, and a set of analytics rules;
receive, in real-time, by the scheduling analytics engine, work items from a current incoming workload;
route, by the scheduling analytics engine, each work item from the current incoming workload to one of the plurality of workload queues according to the initial schedule;
continually monitor, by the scheduling analytics engine, in real-time the current incoming workload to generate workload updates including a real-time current volume of work and a real-time current backlog of work;
continually monitor, by the scheduling analytics engine, in real-time changes in the set of personnel data to generate personnel data updates including a change in the set of shift patterns associated with each of the personnel data;
generate in real-time a current deviation from adherence to the initial schedule based on the workload updates generated and personnel data updates generated;
determine that the current deviation from adherence is greater than a threshold deviation;
based on the current deviation from adherence being greater than the threshold deviation, generate, through the scheduling analytics engine, an updated schedule to route incoming work from the incoming workload to one of the plurality of workload queues based on the initial schedule, the personnel data updates generated, and the workload updates generated;

reroute, by the scheduling analytics engine, in real-time work items from the current incoming workload according to the updated schedule;

reallocate, through the scheduling analytics engine, personnel data assignments to the plurality of workload queues according to the updated schedule;

generate, through the scheduling analytics engine, a set of backlog information and a set of work distribution information for the updated schedule;

compare, by the scheduling analytics engine, the set of backlog information for the updated schedule to a set of backlog information generated for the initial schedule generate a set of feedback pertaining to a positive or negative effect the updated schedule had on backlog information; and based on the generated set of feedback, regenerate, through the scheduling analytics engine, the updated schedule.

9. The computerized system of claim 8, wherein the processor is further caused to repeat monitor, through the scheduling analytics engine, the current incoming workload until the current deviation from adherence is less than the threshold deviation.

10. The computerized system of claim 8, wherein the historic incoming workloads for a given time period include information detailing a number of interactions routed to each of the plurality of workload queues and the personnel data assigned to each of the plurality of workload queues.

11. The computerized system of claim 8, wherein the current incoming workload further includes a work throughput.

12. The computerized system of claim 8, wherein the processor is further caused to reallocate, through the scheduling analytics engine, personnel data structure assignments to the plurality of workload queues according to the updated schedule and reallocating the current incoming workload according to the updated schedule.

13. The computerized system of claim 8, wherein the processor is further caused to automatically update, through the scheduling analytics engine, the set of analytics rules based on the generated set of feedback.

14. The computerized system of claim 8, wherein the processor is further caused to further comprising receiving updates to the scheduling analytics engine through an engine update input.

15. A non-transitory computer readable medium programmed with computer readable code that upon execution by a processor causes the processor to execute a method for real-time predictive scheduling, comprising:

receive, by a scheduling analytics engine, a set of historical incoming work patterns, the set of historical incoming work patters including historic incoming workloads for a given time period;

receive, through the scheduling analytics engine, a set of personnel data, each of the personnel data including a personnel identification, a set of personnel skills, and a set of shift patterns;

generate, by the scheduling analytics engine, an initial schedule that routes incoming work from an incoming workload to one of a plurality of workload queues based on an analysis of the set of historical incoming work patterns, the set of personnel data, and a set of analytics rules;

receive, in real-time, by the scheduling analytics engine, work items from a current incoming workload;

route, by the scheduling analytics engine, each work item from the current incoming workload to one of the plurality of workload queues according to the initial schedule;

continually monitor, by the scheduling analytics engine, in real-time the current incoming workload to generate workload updates including a real-time current volume of work and a real-time current backlog of work;

continually monitor, by the scheduling analytics engine, in real-time changes in the set of personnel data to generate personnel data updates including a change in the set of shift patterns associated with each of the personnel data;

generate in real-time a current deviation from adherence to the initial schedule based on the workload updates generated and personnel data updates generated;

determine that the current deviation from adherence is greater than a threshold deviation;

based on the current deviation from adherence being greater than the threshold deviation, generate, through the scheduling analytics engine, an updated schedule to route incoming work from the incoming workload to one of the plurality of workload queues based on the initial schedule, the personnel data updates generated, and the workload updates generated;

reroute, by the scheduling analytics engine, in real-time work items from the current incoming workload according to the updated schedule;

reallocate, by the scheduling analytics engine, personnel data assignments to the plurality of workload queues according to the updated schedule;

generate, by the scheduling analytics engine, a set of backlog information and a set of work distribution information for the updated schedule;

compare, by the scheduling analytics engine, the set of backlog information for the updated schedule to a set of backlog information generated for the initial schedule generate a set of feedback pertaining to a positive or negative effect the updated schedule had on backlog information; and based on the generated set of feedback, regenerate, through the scheduling analytics engine, the updated schedule.

16. The non-transitory computer readable medium of claim 15, wherein the processor is further caused to repeatedly monitor, by the schedule analytics engine, the current incoming workload until the current deviation from adherence is less than the threshold deviation.

17. The non-transitory computer readable medium of claim 15, wherein the historic incoming workloads for a given time period include information detailing a number of interactions routed to each of the plurality of workload queues and the personnel data assigned to each of the plurality of workload queues.

18. The non-transitory computer readable medium of claim 15, wherein the current incoming workload further includes a work throughput.

19. The non-transitory computer readable medium of claim 15, wherein the processor is further caused to reallocate, by the scheduling analytics engine, personnel data assignments to the plurality of workload queues according to the updated schedule and reallocating the current incoming workload according to the updated schedule.

20. The non-transitory computer readable medium of claim 15, wherein the processor is further caused to update, by the scheduling analytics engine, the set of analytics rules based on the generated set of feedback.

\* \* \* \* \*